US012449597B2

(12) United States Patent
Bian et al.

(10) Patent No.: US 12,449,597 B2
(45) Date of Patent: Oct. 21, 2025

(54) EDGE COUPLERS WITH COUPLING-ASSISTING FEATURES

(71) Applicant: GlobalFoundries U.S. Inc., Malta, NY (US)

(72) Inventors: Yusheng Bian, Ballston Lake, NY (US); Takako Hirokawa, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 279 days.

(21) Appl. No.: 18/196,727

(22) Filed: May 12, 2023

(65) Prior Publication Data

US 2024/0377582 A1 Nov. 14, 2024

(51) Int. Cl.
 *G02B 6/122* (2006.01)
 *G02B 6/13* (2006.01)

(52) U.S. Cl.
 CPC ............. *G02B 6/1228* (2013.01); *G02B 6/13* (2013.01)

(58) Field of Classification Search
 CPC ................ G02B 6/1228; G02B 6/13
 See application file for complete search history.

(56) References Cited

U.S. PATENT DOCUMENTS

| 11,215,756 B2 | 1/2022 | Bian et al. |
| 11,513,286 B2 | 11/2022 | Bian |
| 2022/0206220 A1* | 6/2022 | Barwicz ................. G02B 6/136 |

OTHER PUBLICATIONS

Pavel Cheben et al., "Refractive index engineering with subwavelength gratings for efficient microphotonic couplers and planar waveguide multiplexers," Optics Letter 35, 2526-2528 (2010).
Martin Papes et al., "Fiber-chip edge coupler with large mode size for silicon photonic wire waveguides," Optics Express 24, 5026-5038 (2016).
Mu, Xin, Sailong Wu, Lirong Cheng, and H.Y. Fu. 2020. "Edge Couplers in Silicon Photonic Integrated Circuits: A Review" Applied Sciences 10, No. 4: 1538. https://doi.org/10.3390/app10041538.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.
Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.

(Continued)

*Primary Examiner* — Michael P Mooney
(74) *Attorney, Agent, or Firm* — Thompson Hine LLP; Anthony Canale

(57) ABSTRACT

Structures including an edge coupler and methods of forming such structures. The structure comprises an edge coupler including a first portion and a second portion between the first portion and a semiconductor substrate, a first coupling-assistance feature adjacent to the first portion of the edge coupler, and a second coupling-assistance feature adjacent to the first portion of the edge coupler. The first portion of the edge coupler is positioned in a lateral direction between the first coupling-assistance feature and the second coupling-assistance feature.

20 Claims, 5 Drawing Sheets

(56) References Cited

OTHER PUBLICATIONS

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "Monolithically integrated self-aligned SiN edge coupler with <0.6/0.8 dB TE/TM insertion loss, <- 39 dB back reflection and >520 mW high-power handling capability," in Optical Fiber Communication Conference (OFC) 2023, Technical Digest Series (Optica Publishing Group, 2023), paper M3C.3.

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

* cited by examiner

EDGE COUPLERS WITH COUPLING-ASSISTING FEATURES

BACKGROUND

The disclosure relates to photonics chips and, more specifically, to structures including an edge coupler and methods of forming such structures.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source, such as an optical fiber or a laser.

The light source may be coupled by an edge coupler, also known as a spot-size converter, to the photonic integrated circuit on the photonics chip. The edge coupler is configured to transfer light of a given mode from the light source to the photonic integrated circuit. The edge coupler may include an inverse taper having a tip that is positioned adjacent to an edge of a cavity in which the light source is situated. The gradually-varying cross-sectional area of the inverse taper supports mode transformation and mode size variation associated with mode conversion when light is transferred from the light source to the edge coupler.

Improved structures including an edge coupler and methods of forming such structures are needed.

SUMMARY

In an embodiment of the invention, a structure for a photonics chip is provided. The structure comprises an edge coupler including a first portion and a second portion disposed between the first portion and a semiconductor substrate, a first coupling-assistance feature adjacent to the first portion of the edge coupler, and a second coupling-assistance feature adjacent to the first portion of the edge coupler. The first portion of the edge coupler is positioned in a lateral direction between the first coupling-assistance feature and the second coupling-assistance feature.

In an embodiment of the invention, a method of forming a structure for a photonics chip is provided. The method comprises forming an edge coupler including a first portion and a second portion disposed between the first portion and a semiconductor substrate, forming a first coupling-assistance feature adjacent to the first portion of the edge coupler, and forming a second coupling-assistance feature adjacent to the first portion of the edge coupler. The first portion of the edge coupler is positioned in a lateral direction between the first coupling-assistance feature and the second coupling-assistance feature.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
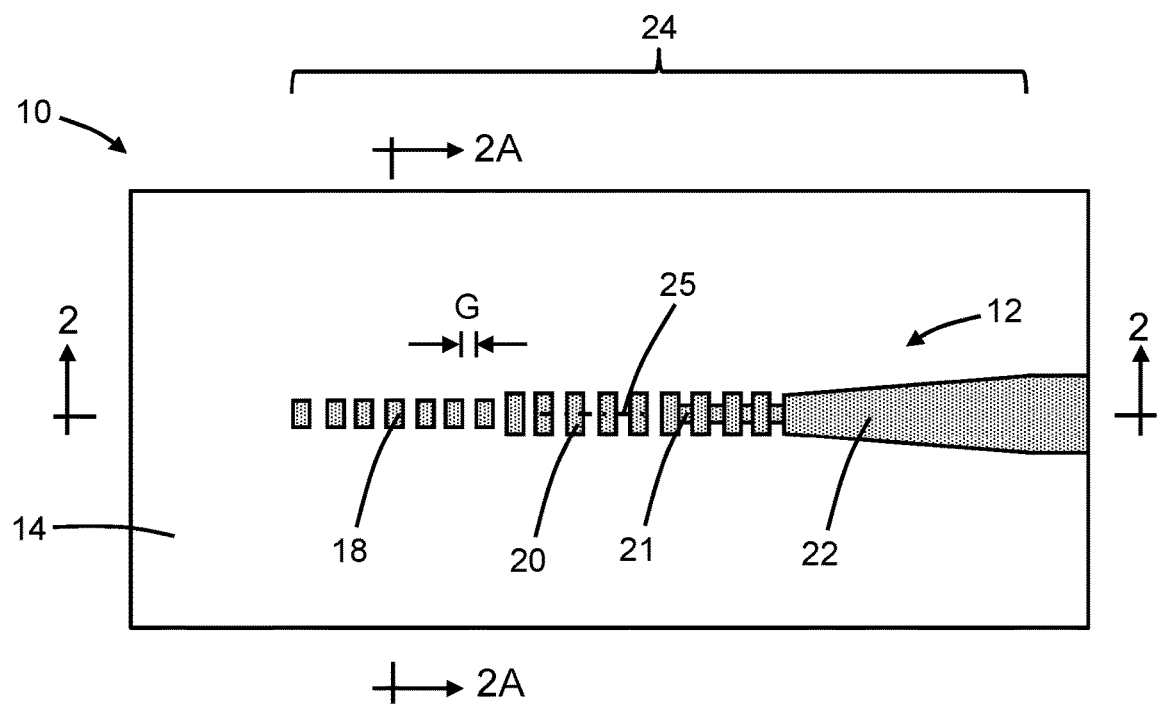
FIG. 1 is a top view of a structure at an initial fabrication stage of a processing method in accordance with embodiments of the invention.
Figure 2:
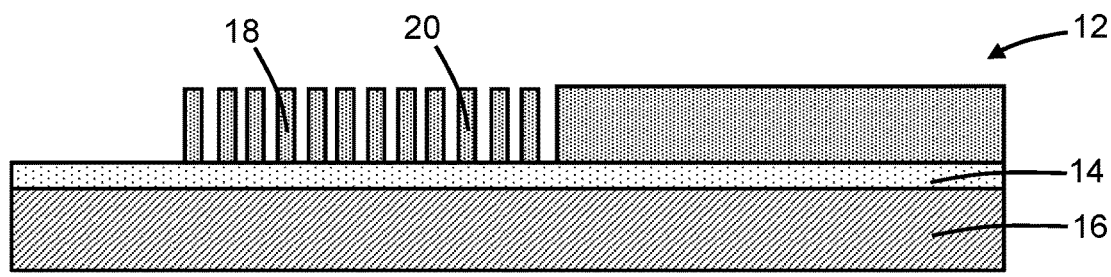
FIG. 2 is a cross-sectional view taken generally along line 2-2 in FIG. 1.
Figure 2A:
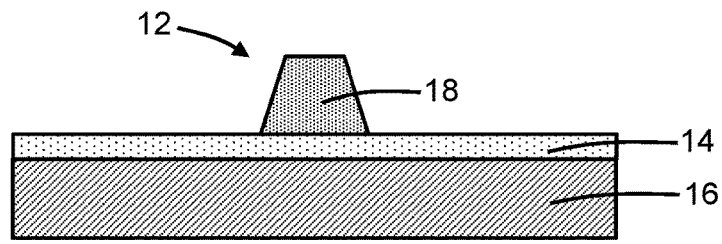
FIG. 2A is a cross-sectional view taken generally along line 2A-2A in FIG. 1.

With reference to FIGS. 1, 2, 2A and in accordance with embodiments of the invention, a structure 10 for a photonics chip includes a waveguide core 12 that is positioned on, and over, a dielectric layer 14 and a semiconductor substrate 16. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate. The waveguide core 12 is separated from the semiconductor substrate 16 by the dielectric material of the intervening dielectric layer 14. The dielectric layer 14 adjoins the semiconductor substrate 16 along an interface, and the dielectric layer 14 has an upper surface on which the waveguide core 12 is positioned. In an alternative embodiment, one or more additional dielectric layers comprised of, for example, silicon dioxide may be positioned between the waveguide core 12 and the upper surface of the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon, amorphous silicon, or polysilicon. In an alternative embodiment, the waveguide core 12 may be comprised of a dielectric material, such as silicon nitride, silicon oxynitride, or aluminum nitride. In alternative embodiments, other materials, such as a III-V compound semiconductor, may be used to form the waveguide core 12.

In an embodiment, the waveguide core 12 may be formed by patterning a layer with lithography and etching processes. In an embodiment, an etch mask may be formed by a lithography process over the layer, and unmasked sections of the layer may be etched and removed with an etching process. The masked sections of the layer may determine the patterned shape of the waveguide core 12. In an embodiment, the waveguide core 12 may be formed by patterning the semiconductor material (e.g., single-crystal silicon) of the device layer of a silicon-on-insulator substrate. In an embodiment, the waveguide core 12 may be formed by patterning a deposited layer comprised of its constituent material (e.g., silicon nitride).

The waveguide core 12 may include multiple segments 18, multiple segments 20, a rib 21 that overlaps with some of the segments 20, and a section 22 that is positioned adjacent to the section including the segments 20 and rib 21. The segments 18, 20, the rib 21, and the section 22 of the waveguide core 12 may define an edge coupler 24. In an embodiment, the edge coupler 24 may include a facet defined by the segment 18 that is most distant from the section 22. The segments 18, 20, the rib 21, and the section 22 may be aligned along a longitudinal axis 25 of the edge coupler 24. The edge coupler 24 may be coupled by the section 22 of the waveguide core 12 to a photonic integrated circuit on the photonics chip. In an embodiment, the edge coupler 24 may be configured to receive light from a light source that is routed by the waveguide core 12 to the photonic integrated circuit.

The segments 18, 20 may be separated by gaps G. In an embodiment, the pitch and duty cycle of the segments 18, 20 may be uniform to define a periodic arrangement. In alternative embodiments, the pitch and/or the duty cycle of the segments 18, 20 may be apodized (i.e., non-uniform) to define an aperiodic arrangement. The segments 18, 20 may be dimensioned and positioned at small enough pitch so as to define a sub-wavelength grating that does not radiate or reflect light at a wavelength of operation.

In alternative embodiments, the edge coupler 24 may have a different configuration. For example, the segments 18, 20 and rib 21 of the waveguide core 12 may be replaced by a solid inverse taper characterized by one or more taper angles and terminated at an end surface defining a facet. As another example, the segments 18, 20 and rib 21 of the waveguide core 12 may be replaced by multiple tips that collective define a facet. As another example, the rib 21 may be absent such that all segments 20 are disconnected.

Figure 3:
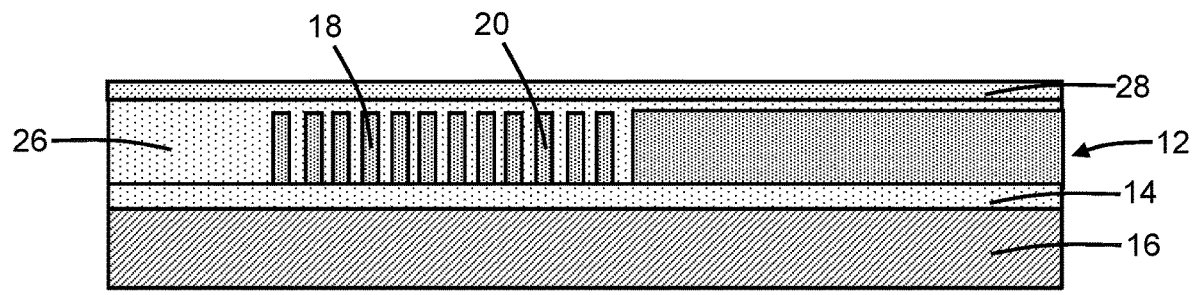
FIGS. 3, 3A are cross-sectional views of the structure at a fabrication stage of the processing method subsequent to FIGS. 1, 2, 2A.
Figure 3A:
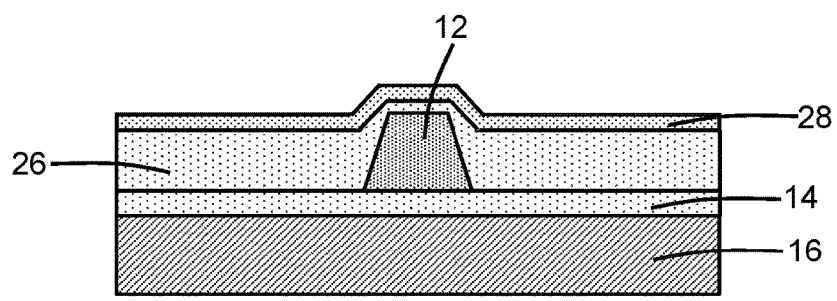

With reference to FIGS. 3, 3A in which like reference numerals refer to like features in FIGS. 1, 2, 2A and at a subsequent fabrication stage, a dielectric layer 26 may be formed over the waveguide core 12. The dielectric layer 26 may be comprised of a dielectric material, such as silicon dioxide. The edge coupler 24 may be embedded in the dielectric layer 26. The dielectric layer 26 is non-planar in the vicinity of the waveguide core 12 due to the topography created by the waveguide core 12.

The dielectric material of the dielectric layer 26 is positioned in the gaps G between adjacent pairs of the segments 18, 20 of the edge coupler 24 such that a metamaterial structure may be defined in which the material constituting the segments 18, 20 has a higher refractive index than the dielectric material of the dielectric layer 26. The metamaterial structure can be treated as a homogeneous material having an effective refractive index that is intermediate between the refractive index of the material constituting the segments 18, 20 and the refractive index of the dielectric material constituting the dielectric layer 26.

A dielectric layer 28 may be formed over the dielectric layer 26. The dielectric layer 28, which may be comprised of a dielectric material such as silicon nitride, may be a conformal layer that has a uniform or substantially uniform thickness and that acquires the topography of the dielectric layer 26 in the vicinity of the waveguide core 12.

Figure 4:
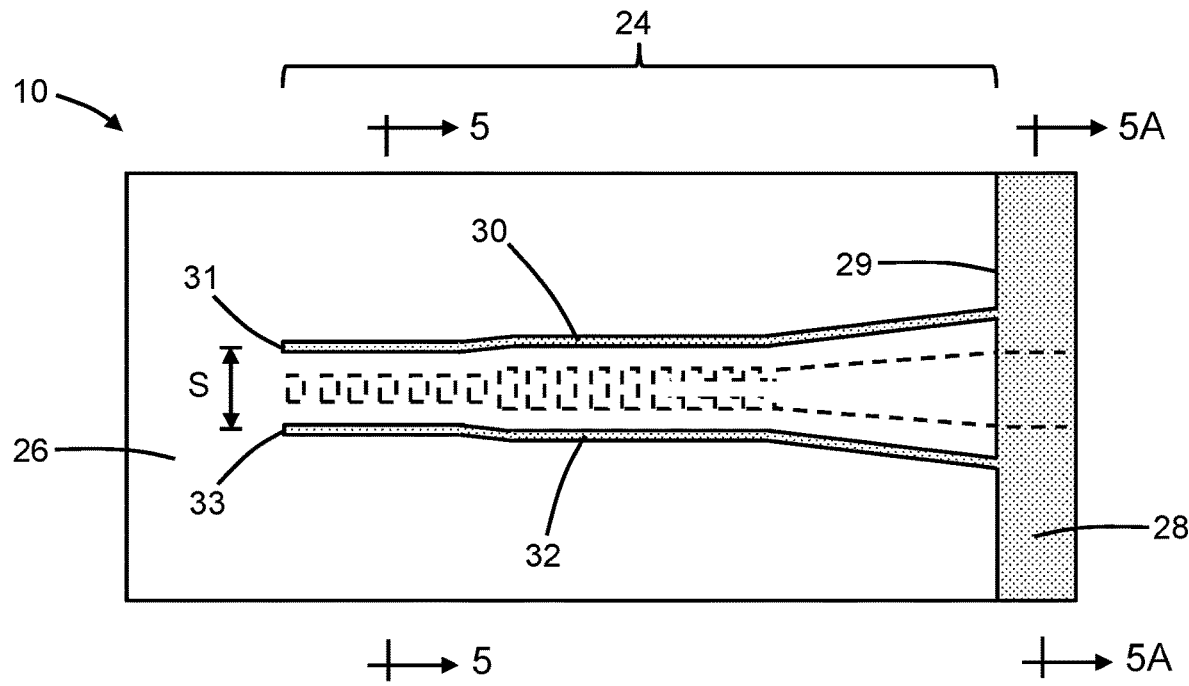
FIG. 4 is a top view of the structure at a fabrication stage of the processing method subsequent to FIGS. 3, 3A.
Figure 5:
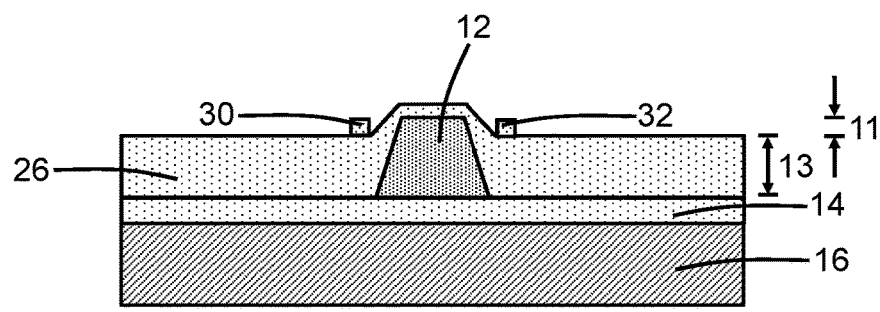
FIG. 5 is a cross-sectional view taken generally along line 5-5 in FIG. 4.
Figure 5A:
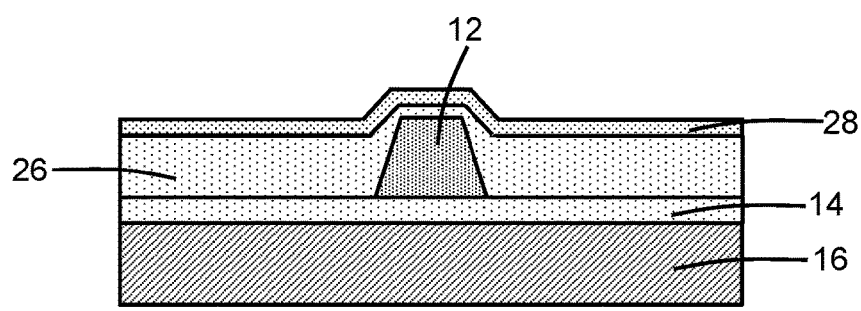
FIG. 5A is a cross-sectional view taken generally along line 5A-5A in FIG. 4.

With reference to FIGS. 4, 5, 5A in which like reference numerals refer to like features in FIGS. 3, 3A and at a subsequent fabrication stage, coupling-assistance features 30, 32 may be formed adjacent to the edge coupler 24 by patterning the dielectric layer 28 with lithography and etching processes. The lithography process may include forming an etch mask by applying a layer of photoresist by a spin-coating process, pre-baking the layer, exposing the layer to light projected through a photomask, baking the layer after exposure, and developing the exposed layer with a chemical developer. The etch mask covers portions of the dielectric layer 28 that define the coupling-assistance features 30, 32 and protects these portions during the etching process. The etching process may be a reactive ion etching process that removes unmasked portions of the dielectric layer 28 and that stops on the dielectric layer 26.

A masked portion of the dielectric layer 28 adjacent to the section 22 of the edge coupler 24 is unetched during the etching process and remains intact. The coupling-assistance feature 30 may terminate at an end 31 that is adjacent to the facet of the edge coupler 24 and may extend from the end 31 to intersect an edge 29 of the unetched portion of the dielectric layer 28. The coupling-assistance feature 32 may terminate at an end 33 that is adjacent to the facet of the edge coupler 24 and may extend from the end 33 to intersect the edge 29 of the unetched portion of the dielectric layer 28.

The edge coupler 24, which is disposed at a lower elevation than the coupling-assistance features 30, 32 and closer to the semiconductor substrate 16, is positioned in a lateral direction between the coupling-assistance feature 30 and the coupling-assistance feature 32. The coupling-assistance features 30, 32 may have a non-overlapping relationship with the edge coupler 24. In contrast, the masked portion of the dielectric layer 28 overlaps with the waveguide core 12, and the coupling-assistance features 30, 32 intersect the edge 29 on opposite sides of the waveguide core 12 and edge coupler 24.

The coupling-assistance feature 30 may be separated from the coupling-assistance feature 32 by a spacing S, which may be a center-to-center distance between the coupling-assistance feature 30 and the coupling-assistance feature 32. In an embodiment, the coupling-assistance features 30, 32 may include multiple connected sections adjacent to different portions of the edge coupler 24, and the spacing S between the coupling-assistance features 30, 32 may vary among their different sections. In an embodiment, the spacing S between the coupling-assistance features 30, 32 may piecewise increase with increasing distance from the ends 31, 33 and with decreasing distance from the edge 29 of the unetched portion of the dielectric layer 28. The smallest spacing S between the coupling-assistance features 30, 32 may be exhibited by the sections adjacent to the segments 18 of the edge coupler 24. The spacing S between the coupling-assistance features 30, 32 may be larger for the sections adjacent to the segments 20 of the edge coupler 24 than the sections adjacent to the segments 18. In an embodiment, the spacing S may be constant between the sections of the coupling-assistance features 30, 32 adjacent to the segments 18, the spacing S may be constant between the sections of the coupling-assistance features 30, 32 adjacent to the segments 20, and the spacing S may change over transition sections between the constant-spacing sections. The largest spacing S between the sections of the coupling-assistance features 30, 32 is exhibited adjacent to the section 22 of the edge coupler 24 and, in an embodiment, the spacing S between these sections of the coupling-assistance features 30, 32 may increase with decreasing distance from the edge 29 of the unetched portion of the dielectric layer 28. The spacing S may vary such that the distance between the opposite side edges of the edge coupler 24 and the different sections of the coupling-assistance features 30, 32 is substantially uniform along the length of the edge coupler 24.

The edge coupler 24 includes a top portion 11 and a bottom portion 13 that is positioned between the top portion 11 and the semiconductor substrate 16. More specifically, each of the segments 18, 20, the rib 21, and the section 22 of the edge coupler 24 include the top and bottom portions 11, 13. The coupling-assistance features 30, 32 are positioned as strips on the dielectric layer 26 adjacent to the top portion 11 of the edge coupler 24 and above the bottom portion 13 of the edge coupler 24.

Figure 6:
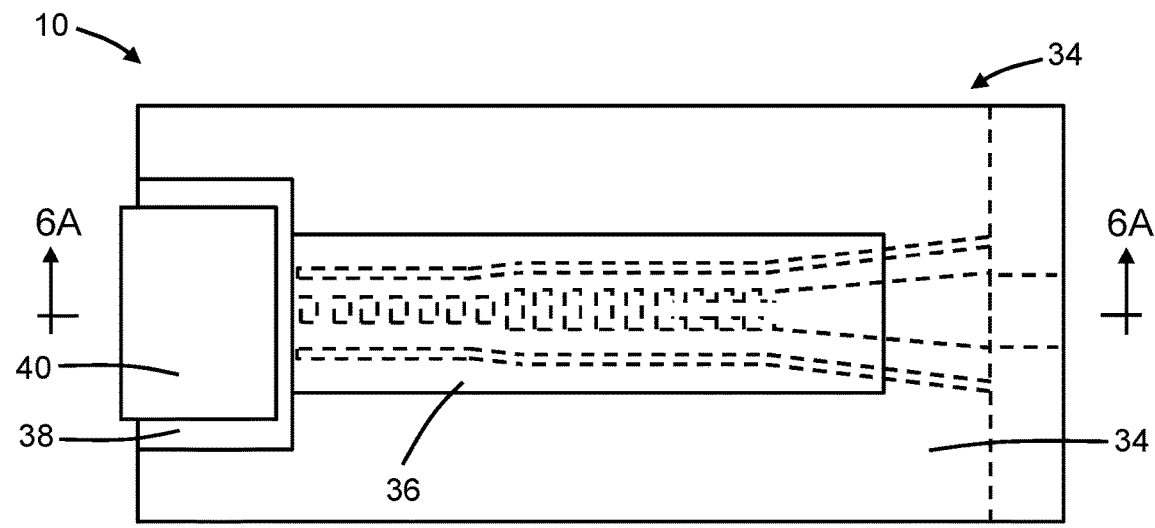
FIG. 6 is a top view of the structure at a fabrication stage of the processing method subsequent to FIGS. 4, 5, 5A.
Figure 6A:
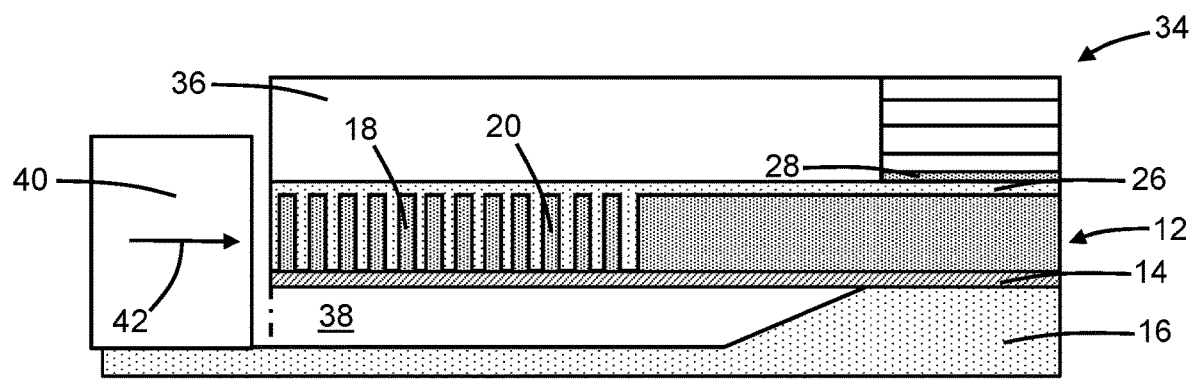
FIG. 6A is a cross-sectional view taken generally along line 6A-6A in FIG. 6.

With reference to FIGS. 6, 6A in which like reference numerals refer to like features in FIGS. 4, 5, 5A and at a subsequent fabrication stage, a back-end-of-line stack 34 may be formed over the structure 10. A dielectric layer 36 that may be formed that replaces a removed portion of the back-end-of-line stack 34 over the edge coupler 24. A cavity 38 may be formed in the semiconductor substrate 16 adjacent to the edge coupler 24. The back-end-of-line stack 34 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide. The dielectric layer 36 may be comprised of a homogenous dielectric material, such as silicon dioxide. The cavity 38 may include a portion that extends as an undercut region beneath the dielectric layer 14 such that all or a portion of the edge coupler 24 is suspended on the dielectric layer 14 over the undercut region. The undercut region of the cavity 38 may function to reduce light loss to the semiconductor substrate 16.

A light source 40 may be placed into the cavity 38. In an embodiment, the light source 40 may be an optical fiber that includes a tip portion inserted into the cavity 38 adjacent to the edge coupler 24. The light source 40 may include a light output 42 that is aligned with the facet of the edge coupler 24 and that is configured to provide light in a mode propagation direction toward the facet of the edge coupler 24. In an embodiment, the optical fiber defining the light source 40 may output light in an infrared wavelength range. In an embodiment, the light source 40 may be a single-mode optical fiber. In an alternative embodiment, the light source 40 may be a laser chip that includes a semiconductor laser configured to output light from the light output 42 in an infrared wavelength range. In an embodiment, the laser chip may include a laser comprised of III-V compound semiconductor materials. In an embodiment, the laser chip may include an indium phosphide/indium-gallium-arsenic phosphide laser that is configured to generate continuous laser light in an infrared wavelength range. In an alternative embodiment, the light source 40 may include a photonic bump having internal turning mirrors and lensed mirrors that collimate and focus light received from an optical fiber and provide the collimated, focused light to the edge coupler 24.

The coupling-assistance features 30, 32 may improve the coupling efficiency of light (e.g., infrared light) from the light source 40 to the edge coupler 24. The edge coupler 24 supports mode transformation and mode size variation during the transfer of the light from the light source 40 to the edge coupler 24. The coupling-assistance features 30, 32 may be used to improve the control over the mode size and to adjust the mode shape. The coupling-assistance features 30, 32 may also reduce the polarization group delay such that light of transverse-magnetic polarization and light of transverse-electric polarization have a reduced time delay.

Figure 7:
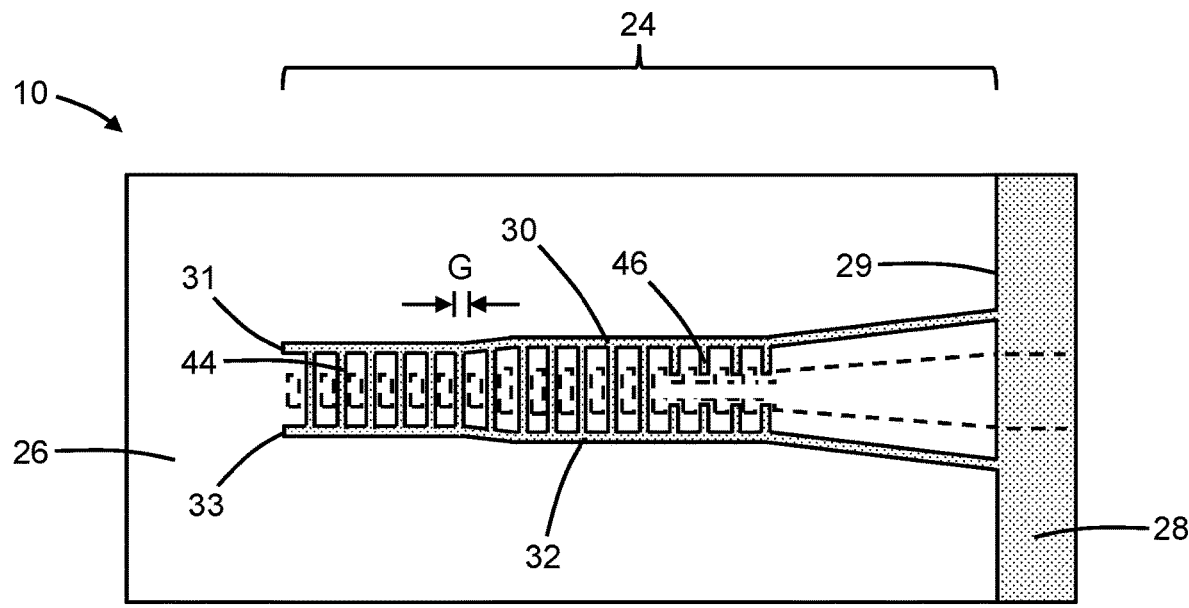
FIG. 7 is a top view of a structure in accordance with alternative embodiments of the invention.

With reference to FIG. 7 and in accordance with alternative embodiments, the coupling-assistance feature 30 may be physically connected to the coupling-assistance feature 32 by connectors 44 that are spaced along the length of the coupling-assistance features 30, 32. In an embodiment, the connectors 44 may extend transverse to the longitudinal axis 25 (FIG. 1) of the edge coupler 24. In an embodiment, the connectors 44 may have a non-overlapping relationship with the segments 18, 20. In an embodiment, each connector 44 may overlap with the gap G between an adjacent pair of the segments 18 or overlap with the gap G between an adjacent pair of the segments 20. Each of the segments 18 may be surrounded by halos of the dielectric material of the coupling-assistance features 30, 32 and connectors 44, and each of the segments 20 not overlapped by the rib 21 may be surrounded by halos of the dielectric material of the coupling-assistance features 30, 32 and connectors 44.

Each of the coupling-assistance features 30, 32 may further include fingers 46 that extend in a lateral direction inward toward the portion of the edge coupler 24 that includes the rib 21. In an embodiment, the fingers 46 may extend transverse to the longitudinal axis 25 of the edge coupler 24. Each finger 46 may overlap with a portion of the gap G between an adjacent pairs of the segments 20 overlapped by the rib 21. Because of the presence of the rib 21, the fingers 46 are shorter than the connectors 44 and do not connect the coupling-assistance feature 30 to the coupling-assistance feature 32. In an embodiment, the fingers 46 may have a non-overlapping relationship with the segments 20 and rib 21.

Figure 8:
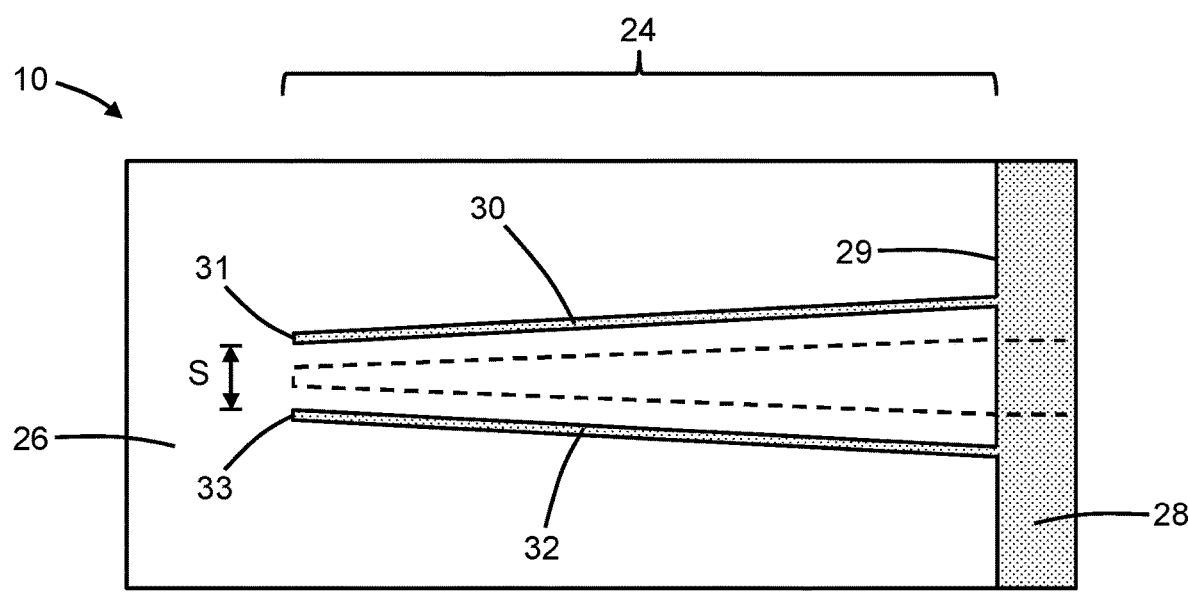
FIG. 8 is a top view of a structure in accordance with alternative embodiments of the invention.

With reference to FIG. 8 and in accordance with alternative embodiments, the edge coupler 24 may have the shape of an inverse taper in which the width of the inverse taper increases with increasing distance from a terminating end defining a facet that is eventually disposed adjacent to the light source 40. The terminating end of the edge coupler 24 is disposed adjacent to the ends 31, 33 of the coupling-assistance features 30, 32. The coupling-assistance features 30, 32 may be inclined relative to the longitudinal axis 25 of the edge coupler 24 such that the spacing S between the coupling-assistance features 30, 32 increases with decreasing distance from the edge 29 of the dielectric layer 28. The inclination of the coupling-assistance features 30, 32 may match the taper angle of the edge coupler 24. The spacing S between the coupling-assistance features 30, 32 may vary such that the distance between the opposite side edges of the edge coupler 24 and the coupling-assistance features 30, 32 is substantially uniform along the length of the edge coupler 24. In an embodiment, the spacing S between the coupling-assistance features 30, 32 may monotonically increase with decreasing distance from the edge 29 of the dielectric layer 28 if the edge coupler 24 is characterized by a single taper angle.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
    a semiconductor substrate;
    an edge coupler including a first portion and a second portion between the first portion and the semiconductor substrate;
    a first coupling-assistance feature adjacent to the first portion of the edge coupler;
    a second coupling-assistance feature adjacent to the first portion of the edge coupler; and
    a plurality of connectors that extend from the first coupling-assistance feature to the second coupling-assistance feature,
    wherein the first portion of the edge coupler is positioned in a lateral direction between the first coupling-assistance feature and the second coupling-assistance feature.

2. The structure of claim 1 wherein the edge coupler includes a longitudinal axis, and the first coupling-assistance feature is separated from the second coupling-assistance feature by a spacing in a direction transverse to the longitudinal axis of the edge coupler.

3. The structure of claim 2 wherein the spacing varies with position along the longitudinal axis.

4. The structure of claim 2 wherein the edge coupler includes a facet, the first coupling-assistance feature is a first strip that includes an end adjacent to the facet, the second coupling-assistance feature is a second strip includes an end adjacent to the facet, and the spacing increases with increasing distance from the facet.

5. The structure of claim 2 wherein the edge coupler includes a facet, the first coupling-assistance feature is a first strip that includes an end adjacent to the facet, the second coupling-assistance feature is a second strip includes an end adjacent to the facet, and the spacing increases piecewise with increasing distance from the facet.

6. The structure of claim 1 wherein the edge coupler includes a plurality of segments and a plurality of gaps between adjacent pairs of the segments, and each connector overlaps with one of the gaps.

7. The structure of claim 1 wherein the edge coupler includes a longitudinal axis, and each connector is aligned transverse to the longitudinal axis.

8. The structure of claim 1 comprising:
    a plurality of fingers extending from the first coupling-assistance feature toward the edge coupler.

9. The structure of claim 8 wherein the edge coupler includes a plurality of segments and a plurality of gaps between adjacent pairs of the segments, and each finger overlaps with a portion of one of the gaps.

10. The structure of claim 8 wherein the edge coupler includes a longitudinal axis, and each finger is aligned transverse to the longitudinal axis.

11. The structure of claim 1 wherein the edge coupler includes a longitudinal axis, and the first coupling-assistance feature and the second coupling-assistance feature each include a portion that is inclined relative to the longitudinal axis of the edge coupler.

12. The structure of claim 1 further comprising:
    a back-end-of-line stack including a dielectric layer, the dielectric layer having an edge adjacent to the edge coupler,
    wherein the first coupling-assistance feature is connected to the edge of the dielectric layer, and the second coupling-assistance feature is connected to the edge of the dielectric layer.

13. The structure of claim 12 wherein the edge coupler includes a longitudinal axis, and the edge of the dielectric layer is aligned transverse to the longitudinal axis.

14. The structure of claim 1 wherein the edge coupler comprises silicon, and the first coupling-assistance feature and the second coupling-assistance feature comprise silicon nitride.

15. The structure of claim 1 further comprising:
    a first dielectric layer on the semiconductor substrate,
    wherein the first coupling-assistance feature and the second coupling-assistance feature are positioned on the first dielectric layer.

16. The structure of claim 15 wherein the first dielectric layer is positioned between the first portion of the edge coupler and the semiconductor substrate.

17. The structure of claim 16 further comprising:
    a second dielectric layer between the first dielectric layer and the semiconductor substrate,
    wherein the second portion of the edge coupler is positioned on the second dielectric layer.

18. The structure of claim 1 wherein the edge coupler includes a facet, and further comprising:
    a light source adjacent to the edge coupler, the light source having a light output configured to provide light in a mode propagation direction toward the facet of the edge coupler.

19. A method of forming a structure for a photonics chip, the method comprising:

forming an edge coupler including a first portion and a second portion between the first portion and a semiconductor substrate;

forming a first coupling-assistance feature adjacent to the first portion of the edge coupler;

forming a second coupling-assistance feature adjacent to the first portion of the edge coupler; and forming a plurality of connectors that extend from the first coupling-assistance feature to the second coupling-assistance feature, wherein the first portion of the edge coupler is positioned in a lateral direction between the first coupling-assistance feature and the second coupling-assistance feature.

20. The structure of claim 18 wherein the light source is an optical fiber, a laser chip, or a photonic bump.

\* \* \* \* \*